US010459789B2

(12) United States Patent
Saliba (10) Patent No.: US 10,459,789 B2
(45) Date of Patent: Oct. 29, 2019

(54) GLOBAL STORAGE SOLUTION WITH LOGICAL CYLINDERS AND CAPSULES

(71) Applicant: Quantum Corporation, San Jose, CA (US)

(72) Inventor: George Saliba, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 418 days.

(21) Appl. No.: 14/723,005

(22) Filed: May 27, 2015

(65) Prior Publication Data

US 2016/0349997 A1   Dec. 1, 2016

(51) Int. Cl.
*G06F 3/06* (2006.01)
*G06F 11/10* (2006.01)

(52) U.S. Cl.
CPC ........ *G06F 11/1076* (2013.01); *G06F 3/0607* (2013.01); *G06F 3/067* (2013.01); *G06F 3/0647* (2013.01); *G06F 3/0667* (2013.01); *G06F 3/0685* (2013.01)

(58) Field of Classification Search
CPC .... G06F 3/0604; G06F 3/0619; G06F 3/0638; G06F 3/0647; G06F 3/0683; G06F 11/1004; G06F 11/1076; G06F 12/1408; G06F 2212/402
See application file for complete search history.

(56) References Cited

U.S. PATENT DOCUMENTS

| 7,487,323 | B2* | 2/2009 | Saliba | G06F 3/0605 |
| | | | | 710/33 |
| 7,979,670 | B2* | 7/2011 | Saliba | G06F 3/0608 |
| | | | | 711/202 |
| 2004/0044640 | A1* | 3/2004 | Saliba | A61B 17/4208 |
| 2005/0038954 | A1* | 2/2005 | Saliba | G06F 3/0607 |
| | | | | 711/100 |
| 2006/0036890 | A1* | 2/2006 | Henrickson | G06F 11/1469 |
| | | | | 714/2 |
| 2007/0208744 | A1* | 9/2007 | Krishnaprasad | G06F 21/6227 |
| 2010/0023520 | A1* | 1/2010 | Barboy | G06F 17/3007 |
| | | | | 707/E17.007 |
| 2012/0089781 | A1* | 4/2012 | Ranade | G06F 17/30203 |
| | | | | 711/118 |

(Continued)

OTHER PUBLICATIONS

URL Decoder/Encoder—GUID Converter (Year: 2008).*

*Primary Examiner* — Ramon A. Mercado (57) ABSTRACT

Example apparatus and methods control a data storage system to store data in a self-describing logical data storage capsule using a logical cylindrical recording format. Example apparatus and methods assign a searchable, globally unique identifier to the capsule and associate the globally unique identifier with a user. The logical data storage capsule is migrated from a first data storage medium to a second data storage medium without translating or reformatting the data storage capsule. The data storage capsule contains information describing to a data storage device how to migrate the capsule without translating or reformatting the data storage capsule. Example apparatus and methods dynamically select an error correction approach for storing data in the data storage capsule, de-duplicate, and encrypt the data storage capsule. The data storage capsule may be local, or may be part of a cloud-based storage system.

12 Claims, 7 Drawing Sheets

(56) References Cited

U.S. PATENT DOCUMENTS

| | | | | |
|---|---|---|---|---|
| 2012/0131352 A1* | 5/2012 | Gleichauf | ........... | G06F 11/1456 713/189 |
| 2013/0204849 A1* | 8/2013 | Chacko | ................ | G06F 3/0604 707/692 |
| 2015/0161411 A1* | 6/2015 | Shikfa | .................. | H04L 9/0894 726/27 |
| 2016/0350187 A1* | 12/2016 | Saliba | ................ | G06F 11/1076 |

* cited by examiner

GLOBAL STORAGE SOLUTION WITH LOGICAL CYLINDERS AND CAPSULES

BACKGROUND

Data is frequently stored across different data storage devices. Different data storage devices may employ different types of data storage media. For example, one cloud-based storage system may employ flash memory organized in solid state drives (SSD) while another cloud-based storage system may store data on tape and hard disk drives. Additionally, the data storage media may be produced by different manufacturers and may employ different proprietary formats. Thus, in conventional data storage systems, data may be stored in different, incompatible formats.

To overcome the problem of data stored in incompatible formats, conventional data storage systems have translated data between the different, incompatible formats. For example, if a data storage system stores some user data on tape in one format and needs to move that data to a disk that accepts only a second format, the data storage system will have to translate the data from the first format to the second format. While translating data between formats makes otherwise incompatible storage devices seem compatible from the perspective of an end user, translating data between formats may be computationally and resource intensive. In a conventional system, the translation between formats may take so much time that the delay is noticeable to a user.

Other conventional data storage systems have approached the problem of handling incompatible data storage formats by employing object stores. Object storage abstracts lower layers of the data storage system away from system administrators and applications using the data storage system. Data stored in an object storage system is managed as objects instead of as files or blocks of data. Conventional cloud-based data storage systems typically employ object stores. However, object stores have limitations that may make them less than optimal when storing or moving data across different, incompatible formats. For example, a search engine may store image data in one proprietary object store format, while a social media network may store image data in another proprietary object store format that is incompatible with the format employed by the search engine. Meanwhile, an online mobile photo sharing service may store image data in yet another different, incompatible, proprietary object store format. A user of all three services may find it inconvenient to have to manage their image data across the three services. Additionally, object storage formats between different physical storage devices may be incompatible. Thus, conventional solutions to the problem of different storage formats may be less than optimal.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Conventional data storage systems may employ different data storage formats. These different data storage formats may be incompatible with each other. To migrate data between data storage systems that employ incompatible formats, conventional data storage systems may translate data between formats. However, translating data between incompatible formats is expensive in both computational resources and time.

Objects stores are one conventional approach for handling different incompatible storage formats. Object storage abstracts some of the lower levels of storage away from system administrators and data storage applications, freeing the administrators and applications from the need to expend time and resources dealing with translating data between incompatible formats. For example, an object storage system may separate metadata from data, storing data as a binary large object (BLOB) in one logical location separate from metadata describing the BLOB. The data is then exposed to the user, which may be an application, as objects instead of as individual blocks or files. However, since the format in which data is stored is typically a function of the storage medium (e.g., tape, disk, flash memory) and the device manipulating the storage medium (e.g., tape drive, disk drive, solid state device), conventional object stores still have to deal with different physical storage formats.

These different physical storage formats may impose undesirable costs in both time spent and computational resources expended when migrating an object store from one physical medium to another. For example, a user may wish to migrate a data set stored in a cloud storage system physically located in Ohio to a different storage system physically located in Hong Kong. The storage system in Ohio may include tape drives that store an older portion of the data set, and hard disk drives that store newer portions of the data set. While storing older portions on tape and newer portions on disk may offer some efficiencies to the storage system, the user may experience unwanted delays in some situations as the storage system reads data from the slower tape. The storage system in Hong Kong, may, however, employ solid state devices and shingled magnetic recording (SMR) drives produced by different manufacturers using different standards than the tape and disk system in Ohio. Thus, even though the system in Ohio and the system in Hong Kong may both use object storage, the formats may be incompatible, and the data may need to be translated, at least at the object level.

Example methods and apparatus handle the differences between incompatible formats by employing a logical cylindrical recording format with data storage capsules and vessels. A logical cylindrical recording format is described in US 2004/0044640 by the same inventor, which is incorporated by reference herein.

In a logical cylindrical recording format, a data storage medium is partitioned into a number of storage rings. Each storage ring has a defined size. One or more storage rings are logically and physically grouped into one or more storage cylinders. The defined size of each storage ring in a storage cylinder is the same. The number of storage rings in a storage cylinder is set to a predetermined number. A data storage ring has a defined length and can store data corresponding to one file, multiple files, or a portion of a file, and the files may be of different lengths. A data storage cylinder has x and y dimensions defined by the number and arrangement of storage rings in the data storage cylinder. The dimensions may be matched to characteristics of the storage medium. For example, a storage cylinder stored on tape may have more dimensions longitudinally than laterally because data may be accessed more quickly longitudinally on tape than laterally. In other media, the storage cylinder may have different dimensions, based, at least in part, on properties of the other media.

A storage ring may have an identifying ring number written at the end of the storage ring. By writing the ring number at the end of the ring, the association between a logical number for the storage ring and the physical location of the storage ring in the storage medium does not need to be stored in a directory. The storage ring is thus self-describing in that the number of the storage ring can be determined as the storage medium is read, without having to check an index or directory. Cylinders may have cylinder numbers that are similarly descriptive. One or more cylinders may be grouped into a set of cylinders.

Data within the storage medium (e.g., data corresponding to a particular file) may be specified using a cylinder number, a ring number, and a location (e.g., mapping) within the storage ring. When data in a storage ring within a cylinder is modified, the entire cylinder is loaded into memory, and after modifying the ring, the entire modified cylinder is re-written to the storage medium. Similarly, when any data in the logical capsule is read or modified, all of the data in the logical capsule is read or modified as a whole. Data capsules are moved as a whole between the storage medium and the interface.

Rings within a cylinder may be designated as data storage rings, while other rings may be designated as redundancy storage rings. Redundancy storage rings may be used for error correction by storing error correction codes (ECC). The ECC may be modified hybrid rateless Reed-Solomon ECCs as described in U.S. patent application Ser. No. 14/722,809 by the same inventor, which is incorporated herein by reference in its entirety, or as fountain codes, or any other type of ECC. The number of rings used for redundancy, and thus for ECC, may be based, at least in part, on a Quality of Service (QoS) approach that varies dynamically based, at least in part, on server side statistics about the data storage system and data usage.

Cylinders or sets of cylinders may be grouped as capsules. Cylinders or sets of cylinders, as capsules, may be grouped into vessels. Logical data storage capsules are described in U.S. Pat. No. 7,487,323 B2 by the same inventor, and incorporated in its entirety herein by reference. Vessels are larger in size than capsules. Capsules or vessels containing capsules may be migrated between different storage devices, where the different storage devices may employ different storage media. Capsules and vessels may be self-describing. A capsule or vessel may carry self-describing information in the form of metadata or inline data. This information describes to storage devices and storage device interfaces how to migrate the capsule between different storage media without translating or reformatting the capsule. Because the rings, cylinders, and by extension, capsules and vessels, carry self-describing information, example methods and apparatus improve on conventional methods for migrating object stores between incompatible formats by reducing the time and resources needed to translate between formats.

Example methods and apparatus generate a globally unique identifier (ID) associated with a capsule. The globally unique identifier may be a uniform resource locater (URL) or other identifier (e.g., a random number). A user (e.g., an individual customer, an application, an administrator, an institution) may purchase, be given, be assigned, or otherwise acquire a capsule in which data may be stored. The user is given access to their purchased capsule by being given the globally unique ID for their capsule. For example, a user may browse with a web browser to the URL associated with their data capsule. The globally unique ID may be searchable by web search engines. For example, the globally unique ID may be retrievable by a web crawler, indexable by a search engine, and searchable by users employing the search engine. A user may thus purchase a data capsule, retrieve their globally unique ID from the vendor, and later search online with a web-based search engine to access their data capsule by searching for the globally unique ID. A search engine may return a link in the form of a URL to the data capsule. Example methods and apparatus may require a login identifier and password or other security measures to allow the user to access their capsule. The capsule may be encrypted.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components.

Furthermore, additional or alternative methodologies can employ additional, not illustrated blocks.

Figure 1:
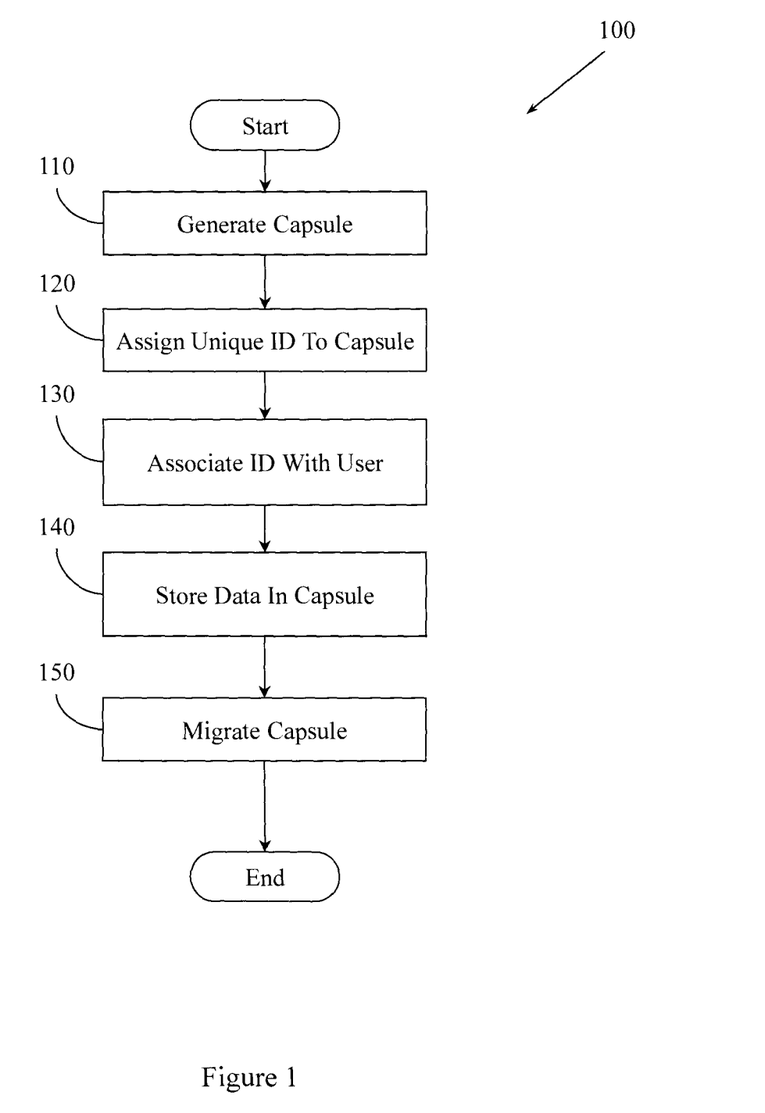
FIG. 1 illustrates an example method associated with a global storage solution (GSS).

FIG. 1 illustrates an example method 100 associated with a global storage solution (GSS). Method 100 includes, at 110, generating a logical data storage capsule. The logical data storage capsule may be self-describing. In one embodiment, the capsule may employ a logical cylindrical recording format as described in US 2004/0044640. The capsule may contain logical data storage rings or logical data storage cylinders. The capsule may contain ring numbers, cylinder numbers, or capsule numbers that identify and locate rings or cylinders in the capsule, as well as identifying the capsule itself. The self-describing logical data storage capsule may also include metadata or other information that describes to a data storage device or to a data storage interface how to migrate the capsule between devices. The capsule may have a defined size.

In one embodiment, the self-describing logical data storage capsule includes a data storage row. A data storage row includes an alternating series of files and cyclic redundancy check (CRC) codes associated with the files, a map of entries in the row, and a CRC for the entire row. The self-describing logical data storage capsule may include an arbitrary number of data storage rows, or the self-describing logical data storage capsule may include a user-defined number of data storage rows. The number of rows may be based, at least in part, on the defined size of the data storage capsule. The self-describing logical data storage capsule also may include an error correcting code (ECC) row. The ECC row may include incline ECCs associated with a particular data storage row.

In one embodiment, the number of ECC rows in the self-describing logical data storage capsule is based, at least in part, on a dynamically varying quality of service (QoS) approach. The QoS approach may vary based, at least in part, on a property of the first data storage device, a property of the second data storage device, or a property of the data storage capsule. In another embodiment, the number of ECC rows is arbitrary.

Method 100 also includes, at 120, assigning a globally unique identifier (ID) to the capsule. The globally unique identifier may be generated by method 100, or may be selected from a previously generated list of globally unique identifiers. In one embodiment, the globally unique ID may be a uniform resource locater (URL). In another embodiment, the globally unique ID may be a random number, a dynamically generated string of random numbers concatenated with other data, or any other format of unique identifier. In one embodiment, a capsule number is generated according to the method described in U.S. Pat. No. 7,487,323. In one embodiment, the globally unique ID is searchable by a user. For example, the globally unique ID may be a URL. The globally unique ID may be retrievable by a web crawler associated with a web search engine. The globally unique ID may then be indexable by a web-based search engine. The globally unique ID may also be queryable by a web-based search engine. For example, a user may search for a particular globally unique ID using a web search engine that has indexed the globally unique ID. The user, upon entering the globally unique ID into the search engine, would then retrieve a result set from the search engine including a link to the logical data storage capsule associated with the globally unique ID. The globally unique ID may also be searchable by an operating system search indexer or a network search tool. For example, in a local area network (LAN) the data storage capsule may be stored in a local data storage device (e.g., server farm) and may be searchable by a user employing a desktop computer search utility other than a web-based search engine.

Method 100 also includes, at 130, associating the globally unique ID with a user. In one embodiment, the user is an individual user who purchases a data capsule from a vendor. The vendor may assign the globally unique ID generated at block 120 to the user. The user may acquire the globally unique ID via an email, a text message, by viewing a web page generated by the vendor, from a system administrator, or in other ways. Associating the globally unique ID with the user gives the user access to the logical data storage capsule. In one embodiment, method 100 also includes, at 130, generating a username and password that enables the user to unlock access to the logical data storage capsule.

Method 100 also includes, at 140, storing data in the logical data storage capsule. The data stored in the logical data storage capsule may be smaller or may be the same size as the capacity of the logical data storage capsule. Data is stored in the logical data storage capsule using a logical cylindrical recording format.

Method 100 also includes, at 150, migrating the logical data storage capsule from a first data storage device to a second data storage device. In one embodiment, the first data storage device employs a first data storage medium, and the second data storage device employs a second, different, data storage medium. Migrating a capsule includes moving the logical data capsule as a whole from the first data storage device, through a data storage interface, to the second data storage device. Migrating the capsule from the first data storage device to the second data storage device is accomplished without reformatting or translating the capsule or the data stored within the capsule, which saves computing resources, time, and power when compared to conventional systems.

In one embodiment of method 100, the first data storage device employs a first data storage medium. For example, the first data storage device may be a disk drive, a tape drive, a solid state device, a random access memory (RAM), or a shingled magnetic recording device (SMR). The first data storage device may include as its data storage medium disk, tape, NAND flash memory, RAM, or SMR disk. In another embodiment, the second data storage device employs a second data storage medium. For example, the second data storage medium may be a disk drive, a tape drive, an SSD, a RAM, or an SMR. In this embodiment, the first data storage medium is different than the second data storage medium. In other embodiments, other data storage media may be employed by both the first data storage device and the second data storage device.

Figure 2:
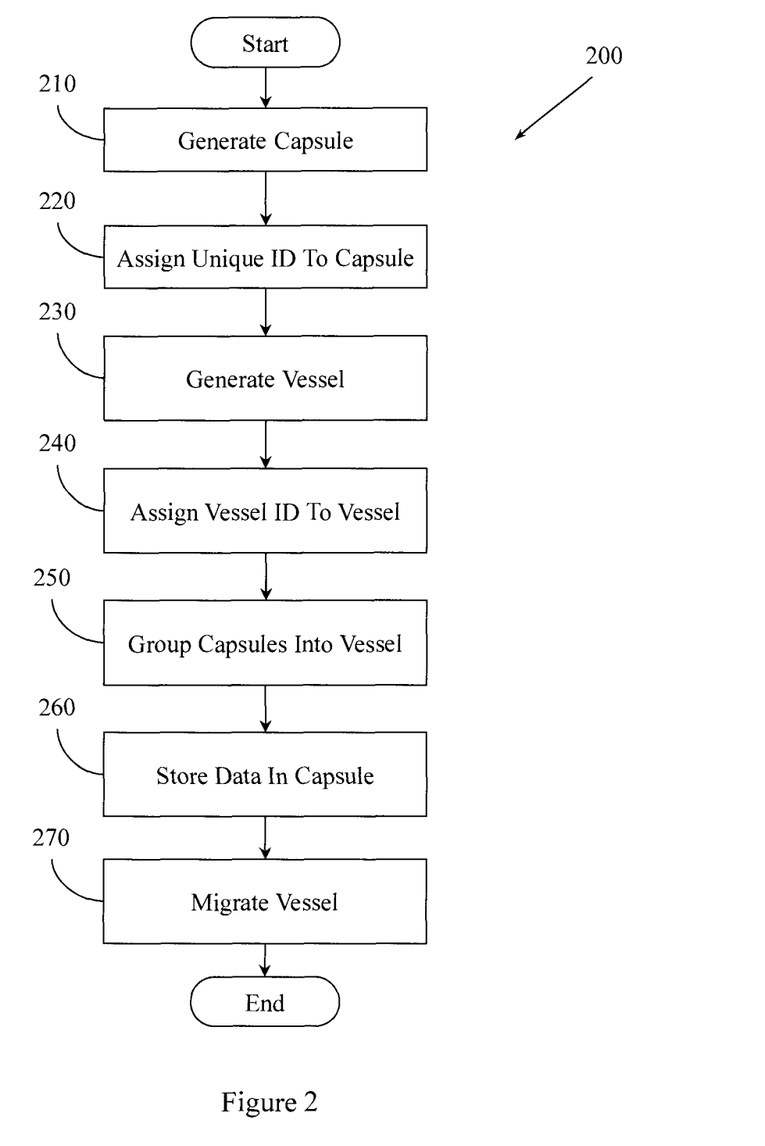
FIG. 2 illustrates an example method associated with a GSS.

FIG. 2 illustrates an example method 200 that is similar to but extends method 100. Method 200, at 210, includes generating a logical data storage capsule on the first data storage device. At 220, method 200 assigns a globally unique ID to the logical data storage capsule. At 230, method 200 generates a logical data storage vessel. The logical data storage vessel is equal to or larger in size than the logical data storage capsule. At 240, method 200 assigns a unique vessel identifier (VID) to the logical data storage vessel. At 250, method 200 groups a set of logical data storage capsules into the logical data storage vessel. Thus, if the number of capsules grouped into the vessel is greater than one, the vessel size will be greater than the capsule size. The capsules may be both logically and physically grouped into the vessel. At 260, method 200 includes storing data into the capsule or capsules.

Method 200 includes, at 270, migrating the logical data storage vessel from a first data storage device to a second, different data storage device. The second data storage device may employ a different data storage medium than the first data storage device. Migrating the vessel is accomplished without reformatting or translating the vessel or the capsules grouped within the vessel. A vessel may contain capsules owned or controlled by the same user, or by different users. In one embodiment, a user may purchase a plurality of capsules from a vendor and the vendor may group the plurality of capsules logically and physically into the same vessel.

Figure 3:
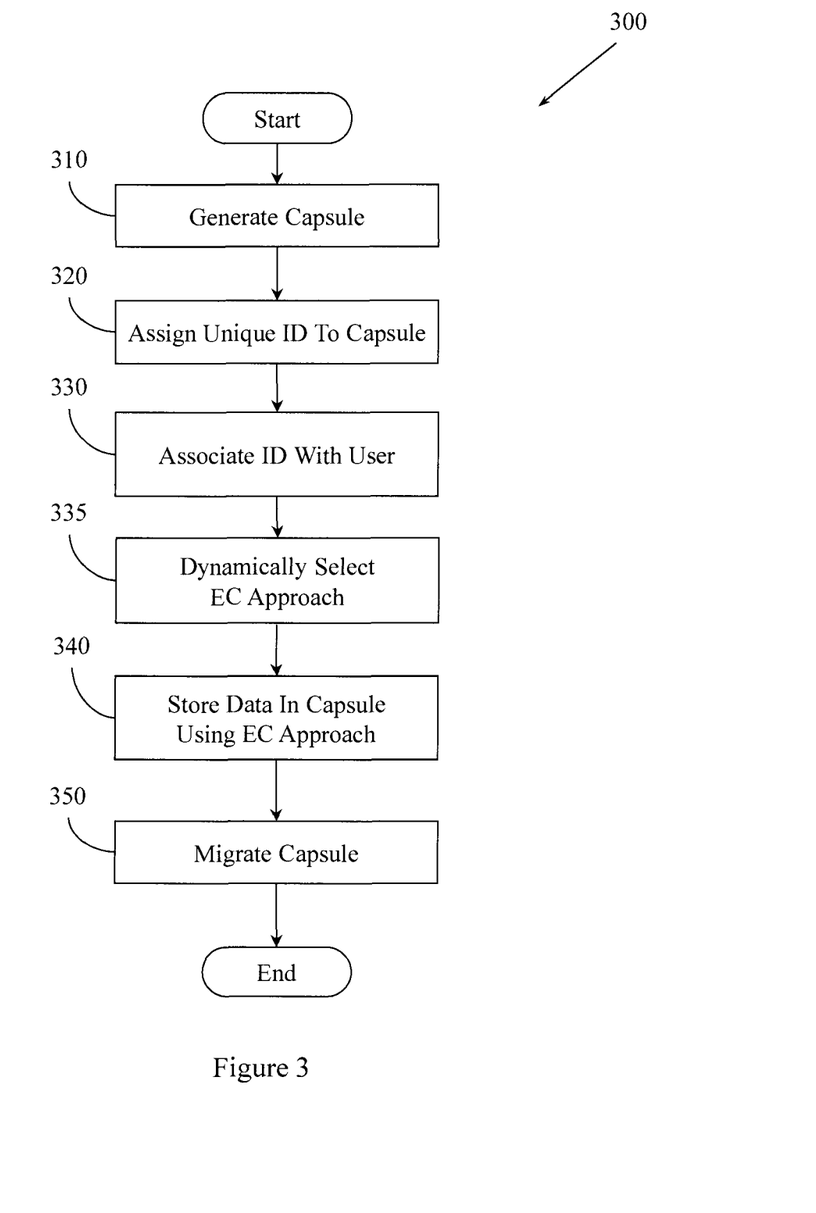
FIG. 3 illustrates an example method associated with a GSS.

FIG. 3 illustrates an example method 300. Method 300 is similar to method 100 but includes, at 335, dynamically selecting an error correction (EC) approach for the logical data storage capsule. Dynamically selecting the EC approach is based, at least in part, on a property of the first data storage device, a property of the second data storage device, network conditions, or a property of the data storage capsule. In one embodiment, the EC approach is dynamically selected from among a hybrid rateless Reed-Solomon error correcting approach or a fountain code error correcting approach. In other embodiments, other error correcting approaches may be selected.

The property of the first data storage device may be related to the performance data about the first data storage device. The property of the first data storage device may include, in one embodiment, an error rate data, a random access time data, a read latency time data, a data transfer rate data, a read performance data, a wear levelling data, an access frequency data, a firmware bug data, a data storage medium architecture data, or a memory type data. In other embodiments, the property of the first data storage device may be related to other performance data.

In one embodiment of method 300, the property of the second data storage device may be related to performance data about the second data storage device. The property of the second data storage device includes, in this embodiment, an error rate data, a random access time data, a read latency time data a data transfer rate data, a read performance data, a wear levelling data, an access frequency data, a firmware bug data, a data storage medium architecture data, or a memory type data. In other embodiments, the property of the second data storage device may be related to other performance data about the second data storage device.

Method 300 also includes, at 340, storing data in the capsule using the dynamically selected EC approach. In one embodiment, the level of redundancy provided by the EC approach is based, at least in part, on a dynamically varying QoS approach that is based, at least in part, on a property of the first data storage device, a property of the second data storage device, network conditions, or a property of the logical data storage capsule. For example, if a high level of redundancy is desired, multiple rows of hybrid-rateless Reed-Solomon EC code may be stored along with the data to be stored. If, however, a low level of redundancy is desired, a smaller number of rows of error correcting codes may be stored. Since the EC approach is selected dynamically, the EC approach may vary as the performance of the data storage device varies. The EC approach may also vary based, at least in part, on a selection by the user. A user may select, for example, a low level of redundancy, a high level of redundancy, or any other relative level of redundancy. A user may also select the type of EC approach used. For example, if the user wishes to trade reliability for speed, a user may select a first, faster EC approach. If the user wishes to trade speed for reliability, a second, slower yet more reliable EC approach may be selected.

Method 300 also includes, at 350, migrating the capsule from the first data storage device to a second, different data storage device. Migrating the capsule is accomplished without reformatting or translating the capsule or the data stored in the capsule.

Figure 4:
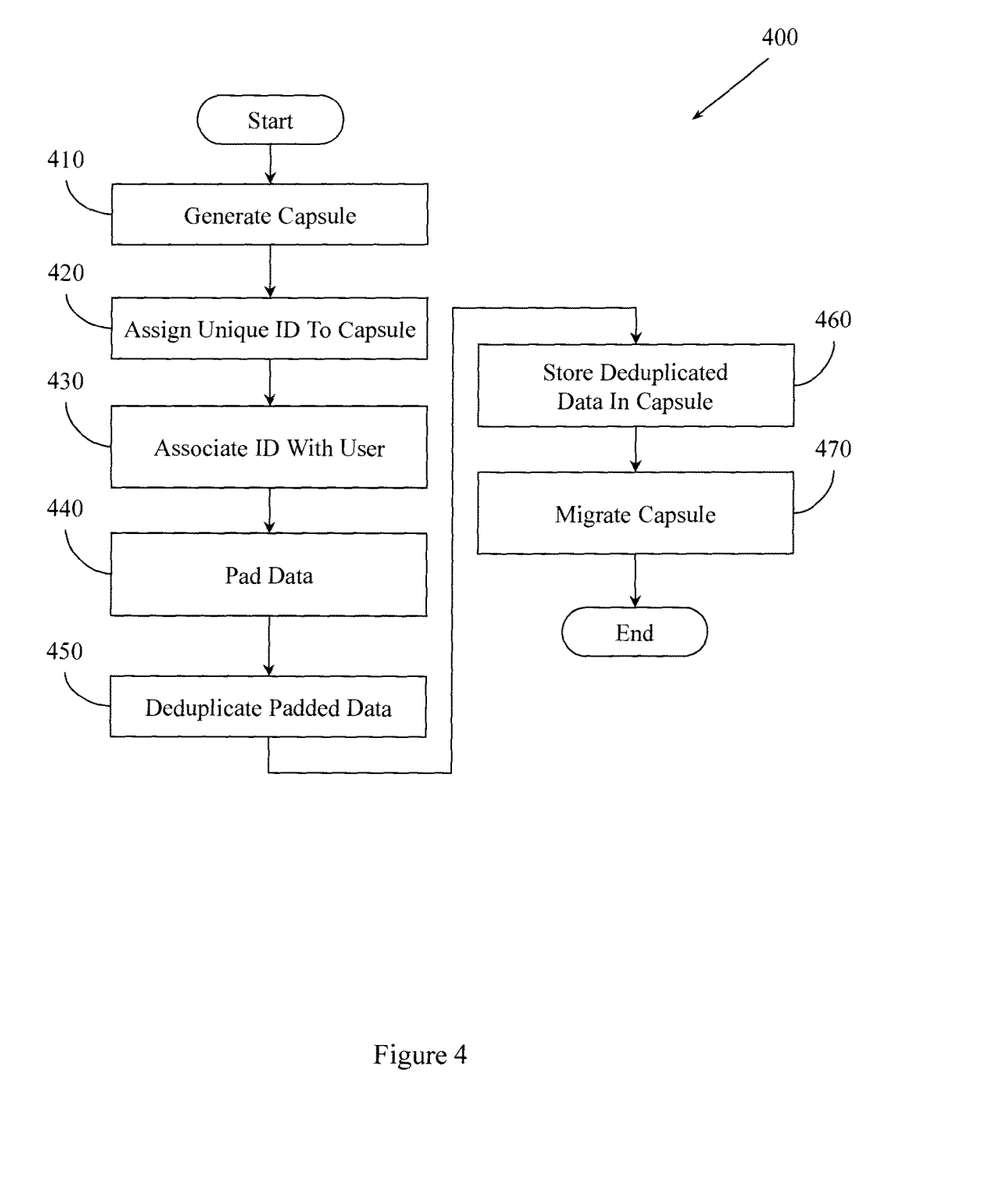
FIG. 4 illustrates an example method associated with a GSS.

FIG. 4 illustrates an example method 400 associated with a global storage system that de-duplicates padded data stored in a self-describing logical data storage capsule. Method 400 includes, at 410, generating a self-describing logical data storage capsule. Method 400 also includes, at 420, assigning a globally unique ID to the capsule. At 430, method 400 includes associating the globally unique ID with a user. In one example, the user may have purchased the capsule from a vendor. In another example, the user may have been assigned a capsule through an intermediary, (e.g., employer, system administrator) between the user and the vendor.

Method 400 includes, at 440, padding the data stored in the capsule. In one embodiment, a data storage row is padded with redundant data. For example, if a data storage row is not filled to capacity by the data stored in it, method 400 may pad the unused portion of the row with redundant files and their associated CRC codes. Padding a data storage row may, in one embodiment, increase the chance that the data storage row will be de-duplicated.

Method 400 includes, at 450, de-duplicating the padded data storage row. Padding the data storage row increases the chance that there will be a match between the CRC for this entire row and the CRC for a different data storage row. In one embodiment, de-duplicating the padded data storage row is based, at least in part, on whether the CRC for the entire padded data storage row matches the CRC for a different data storage row.

Method 400 also includes, at 460, storing the de-duplicated data in the self-describing logical data storage capsule. Method 400 stores the data in a logical cylindrical recording format. Method 400 further includes, at 470, migrating the de-duplicated self-describing logical data storage capsule. In one embodiment, the de-duplicated capsule is migrated from a first data storage device employing a first data storage medium to a second data storage device employing a second, different data storage medium. Migrating the de-duplicated capsule is accomplished without re-formatting or translating the de-duplicated capsule.

Figure 5:
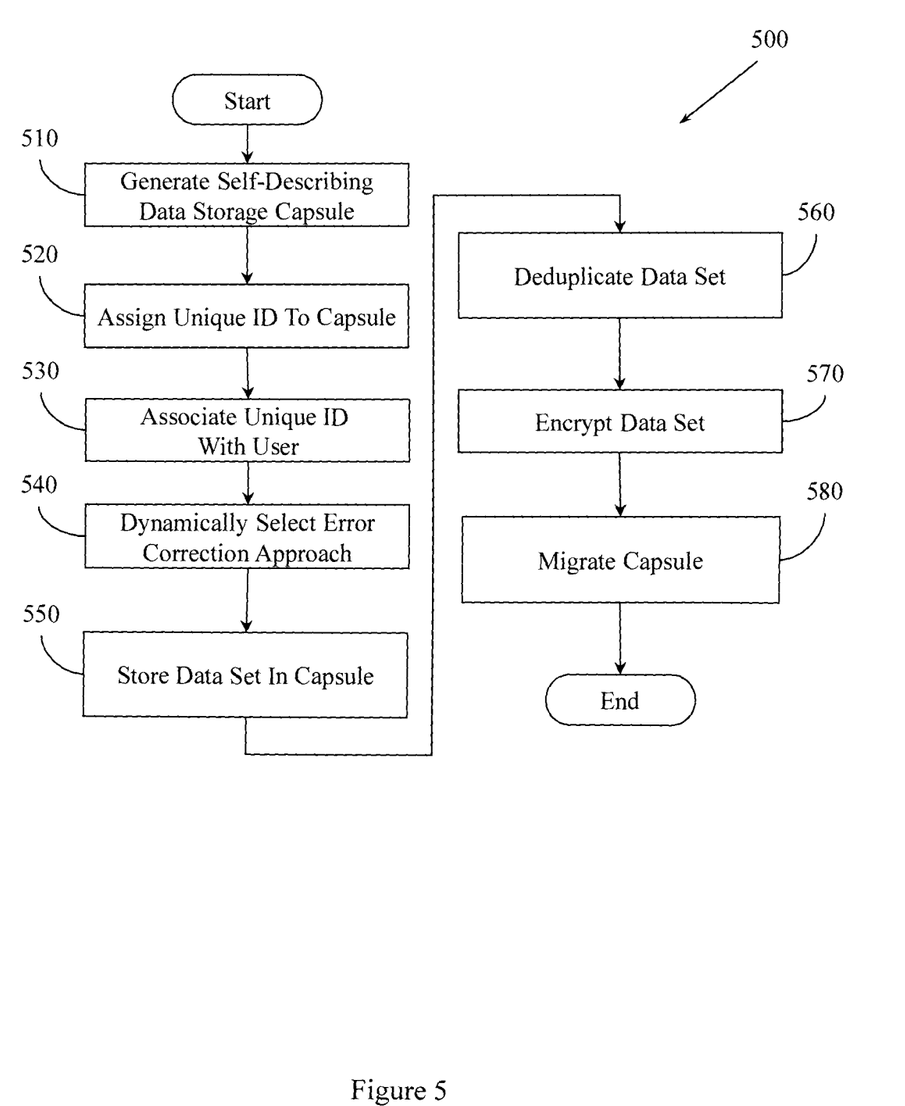
FIG. 5 illustrates an example method associated with a GSS.

FIG. 5 illustrates an example method 500 for storing and migrating data between different electronic storage media. Method 500 includes, at 510, generating a self-describing logical data storage capsule. The self-describing logical data storage capsule is generated on a first data storage medium. The capsule employs a logical cylindrical recording format. In one embodiment, the capsule includes an arbitrary number of data storage rows and an arbitrary number of ECC rows. A data storage row includes an alternating series of files and CRC codes associated with the files, a mapping table of entries in the row, and a CRC code for the entire row. An ECC row includes a set of ECCs associated with a data storage row. The capsule has a defined size.

In one embodiment of method 500, the first data storage medium is tape, disk, RAM, NAND flash memory, or SMR. In one embodiment, the data storage capsule stores information describing how to migrate the data storage capsule from the first data storage medium to a second data storage medium without translating or reformatting the data storage capsule. The second data storage medium may be tape, disk RAM, NAND flash memory, or SMR, and may be a different storage medium than the first data storage medium. In another embodiment, there may be a third data storage medium and a fourth data storage medium. Other numbers and combinations of data storage media may be employed.

Method 500 also includes, at 520, assigning a globally unique ID to the self-describing logical data storage capsule. The globally unique ID is retrievable by a web-crawler, indexable by a search engine, and searchable by a web-search engine. In one embodiment, the globally unique ID may be a URL. In another embodiment, the globally unique ID may be a random number, a randomly generated string, or any other unique identifier indexable by a search engine and searchable by a user.

Method 500 includes, at 530, associating the globally unique ID with a user. In one embodiment, a user may purchase a self-describing logical data storage capsule from a vendor. In this embodiment, the vendor provides the user with the globally unique ID. The user may search for their globally unique ID using a web-based search engine. Once the user has acquired the globally unique ID, the user may browse to a web page generated by the vendor specific to the user's purchased data storage capsule. At the web page, the user may find more information about how to access their data storage capsule. In one embodiment, the user may require a decryption key to access data stored in their capsule. The web page may provide an interface enabling the user to upload data to the data storage capsule, to download data from the data storage capsule, and to manage data stored on the data storage capsule. The interface may also enable the user to manipulate settings related to the level of redundancy of the data storage capsule.

Method 500 also includes, at 540, dynamically selecting an inline EC approach. The EC approach is based, at least in part, on a property of the first data storage medium, or a property of the data storage capsule. In one embodiment, the property of the first data storage medium includes performance data about the first data storage medium. The property may include an error rate data, a random access time data, a read latency time data, a data transfer rate data, a read performance data, a wear levelling data, an access frequency data, a firmware bug data, a data storage medium architecture data, or a memory type data. In other embodiments, the property of the first data storage medium may include other data related to the performance, reliability, and design of the first data storage medium.

Dynamically selecting an EC approach may, in one embodiment, include selecting an EC approach from among a hybrid rateless Reed-Solomon EC approach and a fountain code approach. In other embodiments, other EC approaches may be employed. In conventional data storage systems, EC approaches may be fixed. A conventional fixed approach may be sub-optimal because more ECC may be created than are needed for reliable storage devices, and less ECC may be created than are needed for unreliable storage devices. Creating too much ECC wastes computational resources and time, while creating too little ECC risks data loss. By dynamically selecting an EC approach to apply to the data storage capsule, method 500 produces the concrete, tangible, real-world, non-abstract result of improving efficiency and reliability in a data storage system that stores and migrates data between data storage devices with different operating parameters. In one embodiment, if a data capsule stored in a first data storage device is being migrated to a second, more reliable data storage device across a reliable communication channel, the ECC stored in the capsule may be dropped, thus reducing the amount of storage required at the second data storage device, and also reducing the amount of bandwidth needed to migrate the capsule.

Method 500 also includes, at 550, storing a non-empty data set in the data storage capsule. The non-empty data set may be smaller or equal in size to the capacity of the data storage capsule. In one embodiment, the non-empty data set is stored in the capsule as rows of data. A row of data may include a data storage row including an alternating series of files and CRC codes associated with the files, a mapping of the files and CRCs in the row, and a CRC code for the entire row. The row of data may be padded with redundant data. Padding the row of data with redundant data may increase the likelihood that a CRC for the entire row will match the CRC of another, different row.

The property of the data storage capsule may include data about the non-empty data set stored in the data storage capsule. In one embodiment, the non-empty data set stored in the data storage capsule includes data sub-blocks. The property of the storage capsule is related to properties of the sub-blocks, including an order in which the sub-blocks are accessed, a sub-block reference count, a sub-block access frequency, a sub-block access group relationship, a sub-block accessing entity identity, a sub-block importance, or an indexing parameter.

Method 500 also includes, at 560, de-duplicating the non-empty data set stored in the data storage capsule. De-duplicating the non-empty data set is based, at least in part, on a CRC code of a row of data in the data storage capsule. In one embodiment, the non-empty data set is de-duplicated inline as it is being written to the capsule. In another embodiment, post-processing de-duplication is employed. The de-duplication method may be selected by a user, or may be based, at least in part, on a property of the data storage device. In another embodiment, the level of de-duplication is selectable by a user or altered dynamically based, at least in part, on a property of the data storage medium.

Method 500 also includes, at 570, encrypting the data storage capsule. The user, upon purchasing or otherwise acquiring access to the data storage capsule, may be provided with a decryption key that enables access to the encrypted data storage capsule. Method 500 may encrypt the data storage capsule using RSA encryption, AES encryption, SHA-256 encryption, lattice-based, or other types of encryption.

Method 500 further includes, at 580, migrating the self-describing logical data storage capsule from the first data storage medium to a second data storage medium. The first data storage medium and the second data storage medium may, in one embodiment, be different or incompatible data storage mediums. Migrating the capsule from the first data storage medium to the second data storage medium may be done transparently to the user. Migrating the capsule from the first data storage medium to the second data storage medium is accomplished without reformatting or translating the data storage capsule.

Figure 6:
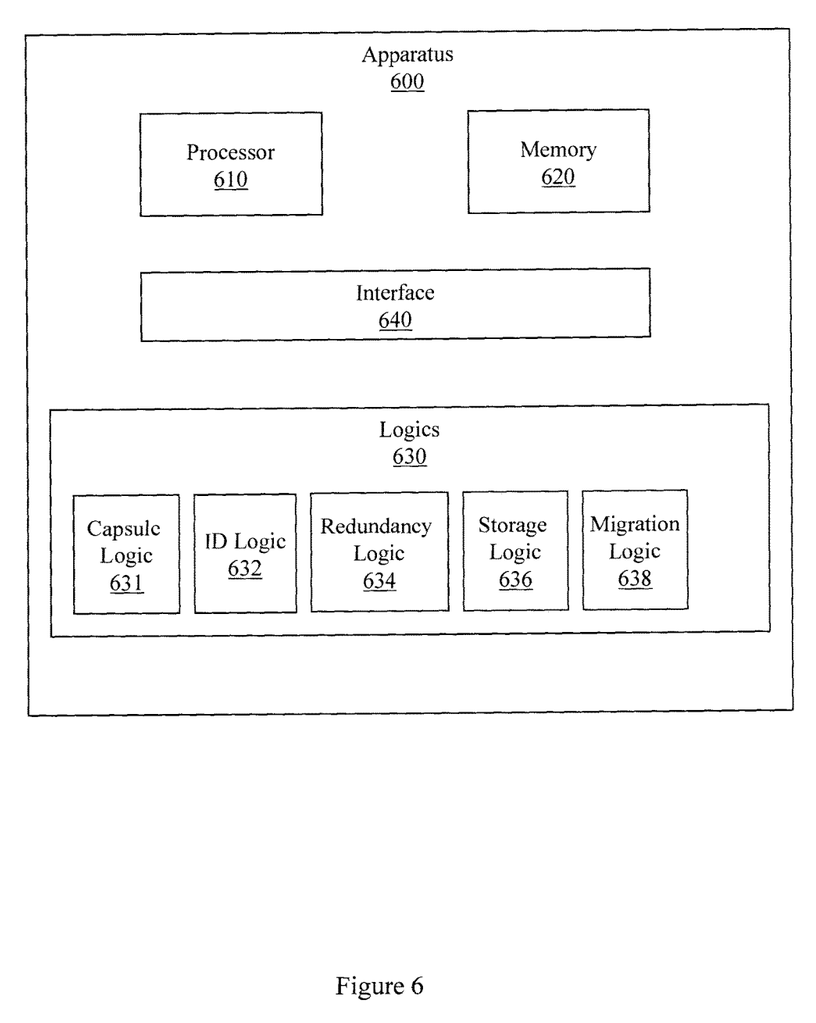
FIG. 6 illustrates an example apparatus associated with a GSS.

FIG. 6 illustrates an example global storage solution apparatus 600 associated with storing data in a first data storage device and migrating the stored data to a second data storage device. Apparatus 600 includes a processor 610, a memory 620, and a set 630 of logics that is connected to the processor 610 and memory 620 by an interface 640. In one embodiment, the apparatus 600 may be a stand-alone device connected to a data communication network. In another embodiment, apparatus 600 may be integrated into another device, including a deduplication apparatus, or system (e.g., cloud storage system, object storage system). Apparatus 600 may be associated with a dynamically variable ECC system that uses hybrid rateless Reed-Solomon ECCs. By dynamically varying the EC approach, apparatus 600 produces the concrete, tangible, real-world, non-abstract result of improving efficiency in an apparatus 600 that stores and migrates data between different storage media.

Memory 620 stores performance data about a first data storage medium and about a second data storage medium. Memory 620 also stores attributes about a non-empty data set that is to be stored or is already stored. Memory 620 may also store a modified Reed-Solomon matrix having row-centric error detection codes and column-centric error correcting codes. The modified Reed-Solomon matrix may take a form similar to that described in U.S. Pat. No. 7,076,723.

The set of logics 630 includes a capsule logic 631. Capsule logic 631 formats a data storage capsule on a first data storage medium. The data storage capsule is formatted by capsule logic 631 using a logical cylindrical recording format, as described in US 2004/0044640. The data storage capsule has a defined size. The data storage capsule is self-describing. In one embodiment, the data storage capsule contains information that can describe to a data storage device how to migrate the data storage capsule from a first data storage device to a second data storage device without translating or reformatting the capsule of the data stored in the capsule. In one embodiment, data is stored in the capsule in data storage rows. In this embodiment, error correction codes may also be stored in ECC rows within the capsule.

The set of logics 630 also includes an ID logic 632. ID logic 632 generates a globally unique identifier. ID logic 632 associates the generated globally unique ID with the data storage capsule. In one embodiment, the globally unique ID is a URL. The globally unique ID is retrievable by a web crawler, indexable by a web-based search engine, and searchable by a web-based search engine. In one embodiment, ID logic 632 associates the globally unique ID with the data storage capsule and assigns the storage capsule and associated globally unique ID to a user who has purchased the storage capsule. The user may search for the globally unique ID using a web-based search engine and be presented by the search engine with the URL.

The set of logics 630 also includes a redundancy logic 634. Redundancy logic 634 dynamically selects an EC approach, based, at least in part, on performance data about the first data storage medium or usage data about the data storage capsule. In one embodiment, the performance data includes an error rate data, a random access time data, a read latency time data, a data transfer rate data, a read performance data, a wear levelling data, an access frequency data, a firmware bug data, a data storage medium architecture data, or a memory type data. Usage data about the data storage capsule includes data regarding data to be stored in the data storage capsule, or data regarding data already stored in the data storage capsule. Usage data may include data about files or data sub-blocks. The usage data about the storage capsule is related to properties of the files or data sub-blocks, including an access order, a reference count, an access frequency, an access group relationship, an accessing entity identity, an importance level, or an indexing parameter.

In one embodiment, redundancy logic 634 dynamically selects an EC approach from among a hybrid rateless Reed-Solomon EC approach or a fountain code EC approach. In other embodiments, redundancy logic 634 may dynamically select an EC approach from among other EC approaches. The EC approach selected may change based on changes in the performance data about the first data storage medium or changes in the usage data about the data storage capsule. The EC approach may also be selected or changed by a user. Redundancy logic 634 may also dynamically adjust the level of redundancy provided to the storage capsule. In one embodiment, the redundancy level is dynamically adjusted, based, at least in part, on a QoS approach. The QoS approach varies dynamically based on server-side statistics about the performance data about the first data storage medium, about performance data about a second data storage medium, or about the usage data about the data storage capsule. Dynamically adjusting the redundancy level may include changing the EC approach to a different EC approach, altering an existing EC approach, or changing the number of ECC rows stored with respect to a data storage row in the capsule.

The set of logics 630 also includes a storage logic 636. Storage logic 636 determines if the size of a non-empty data set to be stored in the data storage capsule is less than the defined size of the data storage capsule. Upon determining that the non-empty data set to be stored in the data storage capsule is smaller than the defined size of the data storage capsule, storage logic 636 pads the non-empty data set with redundant data. Data storage rows in the capsule include an alternating series of files and CRC codes associated with the files, a map of entries in the row, and a CRC code for the entire row. The CRC for the entire row is calculated as a function of the alternating series of files and their associated CRC codes. Padding the non-empty data set may include adding additional, redundant files to a row, along with associated CRC codes. Padding the row therefore increases the chance that a CRC for an entire padded row may match the CRC for an entire, different row.

The set of logics 630 also includes a migration logic 638. Migration logic 638 migrates the data storage capsule from the first data storage medium to a second data storage medium. The first data storage medium may include hard disk, flexible disk, tape, NAND flash memory, RAM, or SMR disk. The second data storage medium may include hard disk, flexible disk, tape, NAND flash memory, RAM, or SMR disk. In one embodiment, the second data storage medium is a different data storage medium than the first data storage medium. Migrating the data storage capsule is accomplished without translating or reformatting the data storage capsule.

Figure 7:
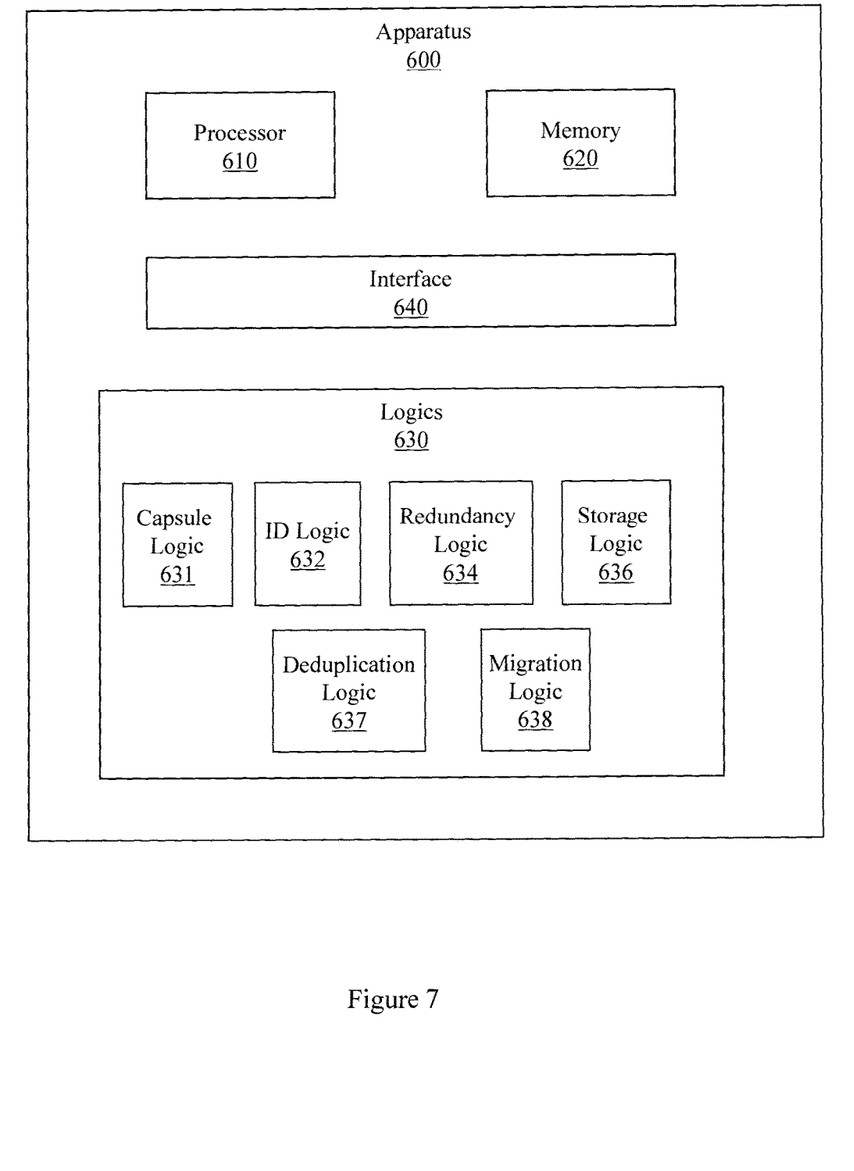
FIG. 7 illustrates an example apparatus associated with a GSS.

FIG. 7 illustrates another embodiment of apparatus 600. In FIG. 7, the set of logics 630 also includes a de-duplication logic 637. De-duplication logic 637 de-duplicates the non-empty set of data stored in the data storage capsule based, at last in part, on the CRC for an entire row of data stored in the data storage capsule. Padding the data storage rows with redundant data increases the chance that a row of data will be de-duplicated by increasing the chance that the CRC for the entire row will match the CRC for another row. In one embodiment, de-duplication logic 637 may perform inline de-duplication. In a different embodiment, de-duplication logic 637 may perform post-processing de-duplication. In another embodiment, de-duplication logic 637 may vary the de-duplication approach based, at least in part, on operational parameters of the data storage medium, on usage data about the data storage capsule, or on a user selection.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Object", as used herein, refers to the usage of object in computer science. From one point of view, an object may be considered to be a location in a physical memory having a value and referenced by an identifier.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage medium storing computer executable instructions that when executed by a computer control the computer to perform a method, the method comprising:
   generating a self-describing logical data storage capsule on a first data storage device, where the data storage capsule employs a logical cylindrical recording format, and where the data storage capsule has a defined size;
   assigning a globally unique identifier (ID) to the data storage capsule, wherein the globally unique ID is indexable by a web search engine;
   associating the globally unique ID with a human user to allow the human user to access the data storage capsule through one or more security measures for the data storage capsule;
   providing the globally unique ID to the human user, wherein the human user provides the globally unique ID to access the data storage capsule;
   storing data in the data storage capsule, where the data stored in the data storage capsule is smaller or equal to the defined size of the data storage capsule, and migrating the data storage capsule from the first data storage device to a second data storage device.

2. The non-transitory computer-readable storage medium of claim 1, the method comprising:
generating, on the first data storage device, a self-describing logical data storage vessel;
assigning a vessel identifier (VID) to the data storage vessel;
grouping a plurality of data storage capsules into the logical data storage vessel, where the members of the plurality of data storage capsules are stored on the first data storage device, and
migrating the data storage vessel from the first data storage device to the second data storage device.

3. The non-transitory computer-readable storage medium of claim 1, the method comprising:
dynamically selecting an error correcting (EC) approach based, at least in part, upon a property of the first data storage device, a property of the second data storage device, or a property of the data storage capsule, and
storing the data storage capsule using the selected EC approach.

4. The non-transitory computer-readable storage medium of claim 3, where the EC approach is a hybrid rateless Reed-Solomon error correcting approach or a fountain code error correcting approach.

5. The non-transitory computer-readable storage medium of claim 1, where the first data storage device is a first medium and where second data storage device is a second medium.

6. The non-transitory computer-readable storage medium of claim 5, where the first medium is a disk drive, a tape drive, a solid state device (SSD), a random access memory (RAM), or a shingled magnetic recording (SMR) device.

7. The non-transitory computer-readable storage medium of claim 6, where the second medium is a disk drive, a tape drive, an SSD, a RAM, or an SMR device.

8. The non-transitory computer-readable storage medium of claim 7, where the first medium is a different medium than the second medium.

9. The non-transitory computer-readable storage medium of claim 1, where the globally unique ID is a uniform resource locater (URL) to which the human user directs a web browser for accessing the data storage capsule.

10. The non-transitory computer-readable storage medium of claim 9, where the globally unique ID is searchable by the human user.

11. The non-transitory computer-readable storage medium of claim 10, where the globally unique ID is retrievable by a web crawler or able to be queried by a web search engine.

12. A non-transitory computer-readable storage medium storing computer executable instructions that when executed by a computer control the computer to perform a method, the method comprising:
generating a self-describing logical data storage capsule on a first data storage device, where the data storage capsule employs a logical cylindrical recording format, and where the data storage capsule has a defined size;
assigning a globally unique identifier (ID) to the data storage capsule, wherein the globally unique ID is indexable by a web search engine;
associating the globally unique ID with a human user;
providing the globally unique ID to the human user, wherein the human user accesses the data storage capsule by querying the web search engine for globally unique ID;
storing data in the data storage capsule, where the data stored in the data storage capsule is smaller or equal to the defined size of the data storage capsule, and
migrating the data storage capsule from the first data storage device to a second data storage device.

* * * * *